Figures 1, 2:
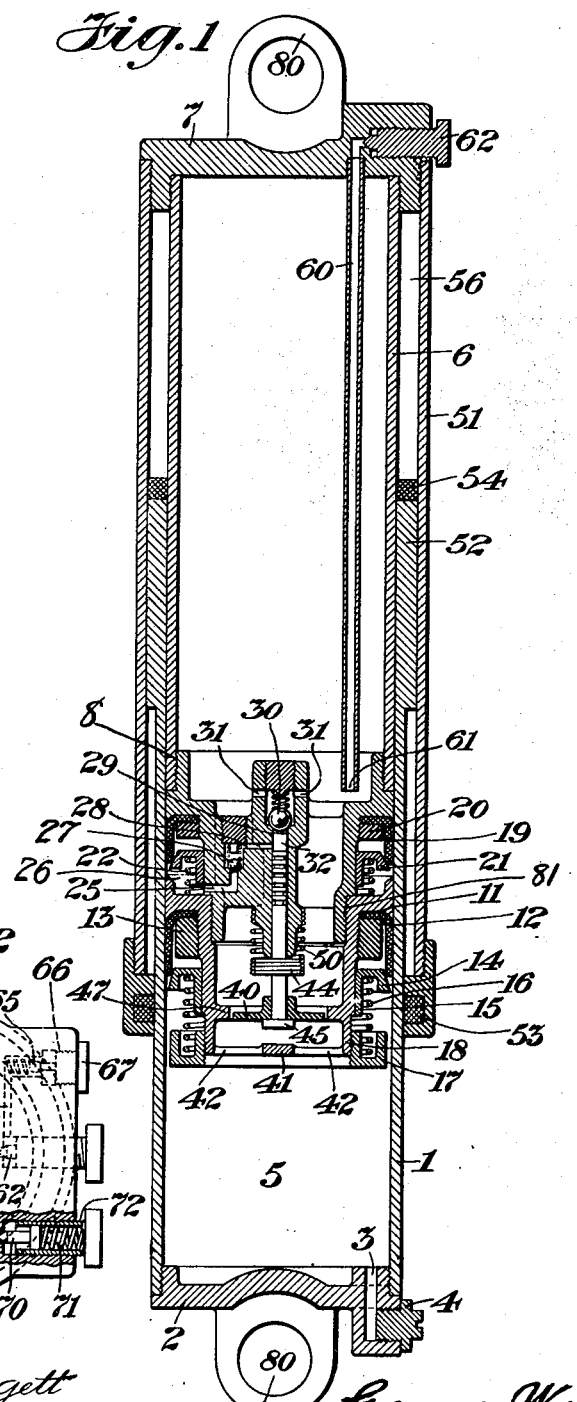

G. WESTINGHOUSE.
FLUID PRESSURE DEVICE.
APPLICATION FILED FEB. 25, 1910. RENEWED AUG. 6, 1913.

1,179,253.

Patented Apr. 11, 1916.

WITNESSES:

INVENTOR
George Westinghouse
BY
G. C. Dean ATTORNEY

UNITED STATES PATENT OFFICE.

GEORGE WESTINGHOUSE, OF PITTSBURGH, PENNSYLVANIA, ASSIGNOR TO THE WESTINGHOUSE AIR SPRING COMPANY, A CORPORATION OF PENNSYLVANIA.

FLUID-PRESSURE DEVICE.

1,179,253.   Specification of Letters Patent.   Patented Apr. 11, 1916.

Application filed February 25, 1910, Serial No. 545,853. Renewed August 6, 1913. Serial No. 783,413.

*To all whom it may concern:*

Be it known that I, GEORGE WESTINGHOUSE, a citizen of the United States, and resident of Pittsburgh, in the county of Allegheny and State of Pennsylvania, have invented certain new and useful Improvements in Fluid-Pressure Devices, of which the following is a specification.

My present invention relates to certain improvements in the devices set forth in my prior Patent Number 1,036,043 filed September 28, 1909. It resembles said prior invention insomuch as it is embodied in an elastic cushion device particularly adapted for use as a spring, which may be used in any relation where two bodies are so associated that resilient movement is desirable, and especially where one or the other of the bodies is subject to sudden movements, vibrations, or shocks which it is undesirable to have transmitted to the other of said bodies. Certain features relating to the packing and lubrication of the sliding joint of the cylinder are applicable in any relations where high pressures are to be sustained.

It will be understood that though capable of use in other relations, the invention has been devised primarily in connection with automobiles, and the general object in view has been to embody the principles of resilient support by an elastic medium, such as air or gas in, a practical self-contained, gas-tight cushioning device adapted to serve all the purposes of the steel springs commonly used, and to combine therewith all the desirable features of a shock absorber, the entire device being adapted to meet the exacting conditions and to stand the rough usage required in connection with automobiles, delivery wagons, trucks, railway rolling stock, etc.

I prefer to make the devces in the form of telescoping tubes with the smaller or inner tube uppermost. The tubes are hermetically closed at the outer ends and the inner tube is provided at the inner end with peripheral packing adapted to form a fluid tight joint, and is internally contracted to form a relatively constricted passage, so that the flow of liquid to and fro between the fixed volume compression space in the upper cylinder and the variable space in the lower cylinder, is more or less throttled. The fluid within the cylinder consists of a compressible medium such as air or other gas in the upper portion, and an incompressible medium, such as oil, glycerin, etc., filling the lower portion, preferably to a level above the packing.

The throttling effect at the lower end of the plunger cylinder is rendered asymmetric by means of a check valve adapted to remain normally open on the compression movement of the spring, but to cut off a desired portion of the passage upon the extension movements. By locating the valve below the normal level of the fluid, all of the fluid which passes to and from the fixed volume compression space is subject to the asymmetric throttling action of the valve. Moreover, the valve is normally below the surface of the liquid when the device is at rest, so that the valve operates initially in the incompressible portion of the fluid medium. The normal internal pressure of the fluid medium is preferably high, but for convenience in practical operation of an automobile, is preferably not higher than can be supplied by an efficient tire pump of the ordinary commercial type.

I use a pump adapted to withdraw any surplus oil which may find its way through the packing of the sliding joint between the cylinders, and to force it back into the cylinder. Such pump is preferably arranged so as to apply a certain degree of suction between the sliding surfaces of the two cylinders at a point between the packings, and this may serve in certain cases to pump small quantities of air into the cylinder, as well as to collect escaping oil. In cases where the pump is of a capacity adapted to produce any noticeable increase of the internal pressure from this cause, I may provide an adjustable relief valve adapted to permit escape of small quantity of air when the internal pressure exceeds the desired value.

In the preferred form, I arrange an annular groove around the outside of the plunger cylinder at a point above the main packing, and arrange a supplemental packing at the upper edge of the groove so that it will tend to collect the oil from the walls of the outer cylinder. The lower edge and bottom of the groove are arranged to drain to the pump intake any oil which may find its way through the main packing.

The pump is located within the cylinder, and is operated entirely by the reciprocating movement of the parts when in use. In the particular form shown herein, the end of the asymmetric check valve stem is used as the pump piston, and its reciprocation is caused by the reciprocating movements of the check valve caused by the flow of fluid. The arrangement is such that the pump piston normally closes the intake, so that when the device is not in use reverse leaks are prevented not only by the usual pump valves, but also by the pump piston.

The valve is loosely mounted on the stem, so as to permit a certain amount of lost motion between it and the valve stem. This serves to render the valve more sensitive in its movements, and, moreover, permits the movement in either direction to acquire a certain momentum before it encounters the resistance of the valve stem. This resistance, of course, includes inertia of the stem, sliding friction, and work done in pumping.

The fluid pressure available on the valve for causing the required stroke of the pump may be enormously multiplied without destroying the asymmetric resistance function, by arranging a secondary constriction approximately midway of the path of travel of the valve. By proportioning this constriction to the size of the valve, so as to permit the latter to pass through in either direction with only a small clearance, practically all of the compression and extension efforts on the device when in operation may be efficiently applied to force movement of the valve during its passage through the constriction.

As in the case of my former invention I employ a charging pipe or passage having an orifice at a desired predetermined level in the compression chamber. When this arrangement is used the liquid may be charged into the cylinder to a level somewhat greater than is desirable in use. The compressed air may then be introduced through the same or another orifice. When the pressure of the air has been adjusted to suit the load and the parts are in a state of rest, the oil may be blown out through the inlet orifice until escape of air indicates that the orifice has been uncovered and that the oil is at the proper level.

My present invention includes a packing comprising a cup leather having an axially movable spring pressure cone bearing upon the free edge thereof and having a wedging engagement with said free edge thereby rigidly yet movably forcing the same into intimate contact with the walls of the cylinder. The cone expander is concentric with the axis of the cylinder and is spring pressed in a direction parallel thereto, by means of a spring the pressure of which may be easily regulated. The cone expander is preferably smaller than the cylinder so that the oil within the cylinder comes directly in contact with the edge of the cup leather thereby bathing the same and maintaining it in fluid tight condition.

Another feature of my invention consists in providing a cup leather packing preferably similar to that just described to act as an oil scraper and as a secondary or supplemental packing at the upper side of the oil collecting groove from which the oil is withdrawn by the pump.

Another feature of my invention consists in reducing the clearance of the pump piston by making the pump barrel of uniform diameter up to the ball valve seat, and making the end of the piston spherically concave so that at the innermost end of the stroke, it will practically fit the ball of the valve without actually touching it.

In the drawings Figure 1 is a vertical or axial section through a cylinder containing my invention. Fig 2 is a top plan view, showing the charging and relief valves.

The lower cylinder 1 is hermetically closed at the bottom by screw plug 2 formed with a discharge passage 3 which is normally closed by a screw plug 4. This cylinder provides the variable space 5, which is adapted to be increased or decreased by up or down movements of the plunger cylinder 6. The latter is provided at the upper end with a hermetic screw closure 7. As shown in the drawings, the lower end is screw threaded at 8 to a plunger head provided with a constricted fluid passage.

The plunger is formed in separate upper and lower sections rigidly connected by a screw joint, as indicated at 81. The lower section is provided with a packing which comprises a seat 11 for a cup leather washer 12 which is clamped thereagainst by a screw ring 13. The free edge of the cup leather is held in intimate engagement with the wall by means of a solid cone ring 14 mounted for movement longitudinally of the cylinder upon a bearing surface formed on the outside of the lower section 15 of said plunger. The cone ring is forced yieldingly into the cup shaped cavity of the packing, against the free edge thereof, by means of a spring 16 bearing against an adjustable ring 17 which is screw threaded upon a downward extension 18 of said lower plunger section 15. By screwing up the ring 17 more or less the longitudinally yielding pressure of the solid cone ring 14, may be accurately adjusted so as to secure the best results. The parts just described are rigidly secured to the upper portion of the plunger by the screw threaded joint at 81 this joint occurring at the level of the bottom of the annular collecting groove wherein escaping oil is collected for return to the interior of the cylinder. Thus the upper portion of the groove is formed by the lower part of the upper plunger section and the lower part of the groove is formed by the upper part and the lower plunger section.

The location of the joint between the sections of the plunger at this point makes it possible to insert within the annular collecting groove, a second cup leather packing substantially similar to the packing just described. This packing comprises the cup leather 19 secured by a screw ring 20 and having its free edge yieldingly held to intimate contact with the cylinder by the longitudinal sliding cone ring 21 yieldingly held in contact therewith by means of spring 22. By this arrangement the edge of the cup leather forms the upper edge of the collecting groove. Both cup leather packings have their edges directed toward the internal pressure and either alone would substantially prevent any material leakage in case the other should break or fail.

In the upper section of the plunger is arranged the means for applying suction to the annular space between the lower or main packing which is below the collecting groove, and the supplemental packing, which is at the upper edge thereof. This suction creating means consists of a pump adapted to be submerged in oil and foam within the device during operation thereof, said pump having an intake 25 extending into operative relation to the oil collecting cavity below the supplemental packing. The intake is provided with a check valve 27 of any known or desired construction and from this valve the passage 28 leads to the pump cavity 29 whence the oil is discharged through the exit valve 30 and passages 31 leading to the interior of the cylinder. The solid head 32 of the pump piston is arranged so as to cover the passage 28 when the plunger is at the end of the expelling stroke and preferably also during most of the suction stroke. In the latter case the passage 28 is arranged so as not to be uncovered until the suction stroke has been completed and the greatest possible vacuum has been created in the pump chamber. When uncovered at this instant the maximum vacuum created within the pump is instantaneously applied as a suction upon the inlet passage 28 and the latter is immediately closed at the beginning of the expelling stroke of the piston so that the remainder of the stroke operates to positively expel any oil and air thus drawn into the pump cavity. By this arrangement leak of the pump during periods of non-use is prevented by the plunger 32 as well as by the check valves 30 and 27. In accordance with my present invention the face of the pump piston is formed with a spherical cavity corresponding to the curvature of the ball of check valve 30. The latter ball covers the full cross section of the pump cavity and the length of the pump plunger is such that the concave face of the pump plunger almost contacts with the valve so that there is practically no clearance at the end of the expelling stroke. This leaves practically nothing in the pump cavity to expand during the suction stroke and accordingly a high degree of vacuum is attained in the pump cavity before the plunger uncovers the intake passage 28.

The pump is operated automatically by relative movement of the parts when in use, and preferably by flow of the fluid medium to and fro between cylinders 1 and 6. In the arrangement shown the valve 40 is adapted to lift from its seat 41 and permit relatively free flow of the fluid medium on the compression strokes of the cylinder and on the return or extension strokes to seat itself thereby nearly closing passages 42, 42 and forcing the fluid to pass through the small space left uncovered for this purpose. The effective total areas available for fluid flow when the asymmetric check valve is in the two extreme positions described, are so proportioned that the flow of the fluid to the variable space 5 on the extension strokes, will be constricted or throttled as compared with the flow from said space on the compression stroke. This operates to temper the violence of recoil of the device after compression thereof.

The forced movements of the valve 40 are utilized to operate the pump piston 32, the valve being mounted upon an extension of the piston, so that it has a sliding or lost motion play between the collar 44 and the annular shoulder 45. This partial freedom of longitudinal movement of the valve permits the valve to move freely in either direction into close proximity to a secondary constriction 47 which conforms closely to the diameter of the valve. At this point the fluid passage is nearly closed by the valve and practically the entire compression and extension efforts are available to drive the valve, and through it the pump piston, at the moment when the valve passes through said constriction. The upward or discharge movement of the pump is preferably caused or assisted by a tension spring 50 secured by screwing into a screw threaded groove on the collar 44 at one end and on the outside of the pump cylinder at the other end.

I prefer to arrange an exterior or guard cylinder 51 screwed to the closure of the cylinder 6 and engaging the outside of the cylinder 1, at the thickened annular edge 52 and at the lower packing 53. The thickened annular edge 52 is preferably provided with a cushion or packing 54 adapted to perform the function of a buffer whenever the compression stroke is sufficiently violent to drive the flange of closure 7 down into contact therewith.

The annular space 56 above packing 54 may be utilized as air compression space, in which air compressed by the movements of 52 may be utilized to maintain an initial pressure greater than atmosphere within the annular space 56, by special arrangements for that purpose set forth in my application of even date herewith. But it will be observed that even with the construction shown in the present drawings there is a tendency to such operation and this may become quite pronounced under certain conditions. For instance, where the device is used as an automobile spring a sudden jolt due to passing over an obstruction may cause the upper cylinder to be depressed sufficiently to bring the packing 54 in contact with the top of the annular space, and this movement being very sudden will result in a momentary enormous compression of the air in the space 56. This pressure leaking through the sliding metallic joint between cylinder 6 and 52 and taking effect on the back side of the cup leather will tend to force air into the annular collecting cavity, especially if this cavity is at that moment in a condition of comparative low pressure due to prior continuous evacuating operation of the internal pump.

The arrangements for charging the device with oil and compresed air are preferably located in head 7 of cylinder 6. As shown in Fig. 1, an inlet tube 60 extends down a desired distance, so that its outlet orifice 61 is at or about the desired level of the liquid to be used. The passage of air or liquid through this tube is controlled by a needle valve indicated at 62. As indicated in Fig. 2, there is a passage 64 leading from the needle valve chamber to an inlet check valve 65, which communicates with a screw threaded opening 66, to which may be connected supply pipes for oil or compressed air. In charging the device oil may be introduced either by removing needle valve 62 and substituting an oil supply pipe, or needle valve 62 may be merely loosened and the oil supplied through the opening 66 and check valve 65. After oil has been charged into the device to a suitable height, which is preferably above the level of the orifice 61 of pipe 60, the compressed air is introduced through 66, 65, 64, 60, until the internal pressure is sufficient to support the desired load with the parts approximately in the position indicated in Fig. 1. The air supply is then detached and surplus oil blown out through pipe 60, until the escape of air indicates that its orifice has been uncovered by the lowering of the level of the liquid. The plug valve 62 and the plug 67 are then screwed tight and the device is in condition for use.

Where the pumping capacity of the pump described above is sufficient to raise the internal pressure of the device, undue rise of pressure may be prevented by an automatic relief valve, which is diagrammatically indicated in Fig. 2 as comprising a plug valve 70, closing spring 71, and screw adjusting means 72 for adjusting the initial pressure of the spring to thereby predetermine the maximum internal pressure, which may be maintained in the device.

The annular collecting groove or chamber 26 is preferably of considerably greater liquid capacity than would be necessary when the device is in continuous use and the pump in more or less continuous operation. With a groove of the size shown, the device may stand for long periods under very heavy loads and considerable oil may leak through the main packing without the possibility of any oil passing above said collecting groove, which forms a break in the capillary path between the close fitting surfaces of the two cylinders, which break can only be bridged by complete filling of the collecting space. It will thus be evident that up to the capacity of the latter space, the device is proof against ultimate loss of oil or internal pressure, because all oil contained in such space will be returned to the interior of the cylinder by the pump as soon as the latter is put in action by the reciprocating movements of the parts, attendant upon normal active use thereof.

As before pointed out both cup leather packings have their edges directed toward the internal pressure and either alone would substantially prevent any material leakage in case the other should fail. With this arrangement the upper packing tends to permit entry of oil or air from the exterior to the space between the packings more easily than in the reverse direction. Hence, when suction is applied between the packings by the pump, oil or air will tend to work into such space from the outside through the upper packing more readily than from the inside through the lower packing notwithstanding the great internal pressure. It results from this that there would be practically no leak to the outside of the joint through the upper packing and in some cases air or oil may be sucked in from the outside in substantial quantities and in such case being forced into the interior of the cylinder by means of the pump, may serve to materially raise the internal pressure.

From the above it will be seen that the upper packing acts as an efficient scraper for removing the surplus oil from the cylinder in case it escapes through the lower packing and may act efficiently as the sole packing in case the lower packing fails. It also determines an annular space in the rear of the lower packing which it sufficiently cuts off from the outer air so that said space may be maintained in a relatively vacuous condition with respect to the outer air as well as with respect to the interior of the cylinder, so that any leak of either packing will be toward the intake of the pump whereby material coming either from the outside or the inside will be forced to the inside of the cylinder.

The above described device is provided at both ends with journals 80, 80, adapted to engage pivots of a universal joint comprising pivots arranged at right angles to each other and a coöperating bracket attached to one of the members to be cushioned by said device.

Various features of my invention are adapted for use in other relations where the conditions and functions to be served are similar, as, for instance, in other devices wherein a sliding joint is required to sustain great pressures without leaking; also they may be used as a supplement to or substitute for and may be supplemented or substituted by features set forth in the application of Richard Liebau, Serial No. 468,762, filed December 22nd, 1908.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. A cushion device comprising a cylinder, a plunger fitted to slide within said cylinder to permit variations of the volumetric capacity thereof, a main packing for the sliding joint between the plunger and the cylinder, a supplemental packing for said joint on the low pressure side of said main packing, in combination with means for applying suction to the sliding joint between said packings.

2. A cushion device comprising a cylinder, a plunger fitted to slide within said cylinder to permit variations of the volumetric capacity thereof, a main packing for the sliding joint between the plunger and the cylinder, a supplemental packing for said joint on the low pressure side of said main packing, in combination with means for removing fluid from said joint between said packings and for forcing such fluid into the variable volume chamber within said device.

3. A cushion device comprising a cylinder, a plunger fitted to slide within said cylinder to permit variations of the volumetric capacity thereof, a main packing for the sliding joint between the plunger and the cylinder, a supplemental packing for said joint on the low pressure side of said main packing, in combination with means operated by relative movement of said plunger and cylinder for applying suction between said packings.

4. A cushion device comprising a cylinder, a plunger fitted to slide within said cylinder to permit variations of the volumetric capacity thereof, successive annular packings for the sliding joint between the plunger and the cylinder in combination with means for removing fluid from the sliding joint between said packings.

5. A cushion device comprising a cylinder, a plunger fitted to slide within said cylinder to permit variations of the volumetric capacity thereof, successive annular packings for the sliding joint between the plunger and the cylinder, in combination with means for removing fluid from the sliding joint between said packings, said means being located within and operated by relative movement of said plunger and cylinder.

6. A cushion device comprising a cylinder, a plunger fitted to slide within said cylinder to permit variations of the volumetric capacity thereof, successive annular packings for the sliding joint between the plunger and the cylinder, in combination with a pump having an intake between said packings and a discharge into the variable space within said cylinder.

7. A cushion device comprising a cylinder, a plunger fitted to slide within said cylinder to permit variations of the volumetric capacity thereof, successive annular packings for the sliding joint between the plunger and the cylinder, in combination with a pump having an intake between said packings and a discharge into the variable space within said cylinder, said pump being operated by relative movement of said cylinder and plunger.

8. An elastic cushioning device of the hydro-pneumatic type, comprising relatively movable members having a sliding joint to permit varying the volume of the compressible and in-compressible fluids within said device, successive packings for said sliding joint, one of said packings being a cup leather arranged to wipe oil from the inner wall of said cylinder into a collecting groove located between said packings, in combination with means for applying suction between said packings.

9. An elastic cushioning device of the hydro-pneumatic type, comprising relatively movable members having a sliding joint to permit varying the volume of the compressible and in-compressible fluids within said device, successive packings for said sliding joint, one of said packings being a cup leather arranged to wipe oil from the inner wall of said cylinder into a collecting groove located between said packings and means for pumping fluid from said collecting groove into the interior of said cylinder.

10. An elastic cushioning device of the hydro-pneumatic type, comprising relatively movable members having a sliding joint to permit varying the volume of the fluid contained in said device, compressible and incompressible fluids within said device successive packings for said sliding joint, one of said packings being a cup leather arranged to wipe oil from the inner wall of said cylinder into a collecting groove located between said packings, in combination with means operated by relative movement of said members for applying suction between said packings.

11. An elastic cushioning device of the hydro-pneumatic type, comprising relatively movable members having a sliding joint to permit varying the volume of the fluid contained in said device, compressible and incompressible fluids within said device, successive packings for said sliding joint, in combination with means operated by flow of fluid within the device for withdrawing fluid from between said packings.

12. An elastic cushioning device of the hydro-pneumatic type, comprising relatively movable members having a sliding joint to permit varying the volume of the fluid contained in said device, compressible and incompressible fluids within said device successive packings for said sliding joint, one of said packings being arranged to wipe oil from the inner wall of said cylinder into a collecting groove located between said packings.

13. A cushion device comprising a cylinder, a plunger fitted to slide within said cylinder to permit variations of the volumetric capacity thereof, successive packings for the sliding joint between the plunger and cylinder, said device containing a compression cavity and a constricted passage for flow of the fluid, in combination with a check valve arranged to be forcibly moved by pressure of the fluid upon relative movement of the parts and a pump operated by said check valve having an intake arranged between said packings and an outlet into the compression space within the device.

14. A hydro-pneumatic cylinder of the class described in combination with a pump submerged in oil and foam within the device during operation thereof and operated by relative movement of the parts of the cylinder to force fluid into a chamber within said cylinder, said pump comprising a pump cylinder and piston and a valve forming a removable wall extending entirely across the section of the cylinder, the parts being proportioned and arranged so that there is practically no clearance at the inner end of the expelling stroke of the piston.

15. An elastic cushioning device of the hydro-pneumatic type, comprising relatively movable members having a sliding joint to permit varying the volume of the compressible and in-compressible fluids within said device, successive packings for said sliding joint each comprising a cup leather and an axially movable cone spring pressed into engagement with the free edge of said cup leather, both of said cup leathers being arranged with their free edges directed toward the interior of said device.

16. An elastic cushioning device of the hydro-pneumatic type, comprising relatively movable members having a sliding joint to permit varying the volume of the fluid contained in said device, compressible and incompressible fluids within said device one of said members being provided with a sectional plunger head in combination with a packing on the one of said sections and a second packing at the joint between said sections.

17. An elastic compression device of the hydro-pneumatic type, comprising relatively movable members having a sliding joint to permit varying the volume of the fluid contained in said device, compressible and incompressible fluids within said device one of said members being provided with a sectional plunger head in combination with a packing on the one of said sections and a second packing at the joint between said sections, said second packing comprising a cup leather and a cone spring pressed against the free edge of said cup leather.

18. An elastic compression device of the hydro-pneumatic type, comprising relatively movable members having a sliding joint to permit varying the volume of the fluid contained in said device, compressible and incompressible fluids within said device one of said members being provided with a sectional plunger head in combination with a packing on the one of said sections and a second packing at the joint between said sections, each of said packings comprising a cup leather having its free edge directed toward the interior of the device, and a cone spring pressed against the free edge of said cup leather.

19. A cushioning device comprising relatively movable members forming a chamber and having a sliding joint therebetween to permit variations in the volumetric capacity of the chamber, compressible and incompressible fluids located within the chamber, said joint between said members being so located with relation to said fluids that incompressible fluid only can escape through the joint, a packing for said joint, and means for subjecting said packing to a reduction of pressure on the chamber side thereof and in opposition to the direction of flow of leakage fluid through the joint.

20. A cushioning device comprising relatively movable members inclosing compressible and incompressible fluids and having a joint therebetween to permit varying the volume of the inclosed fluids, said joint being so located with relation to the fluids contained in the chamber that the only fluid which can escape through said joint would be essentially incompressible fluid, and means, operated by the relative movement of said members for subjecting the chamber side of said packing to a reduction of pressure.

21. A cushioning device comprising relatively movable members having a sliding joint to permit variations in the volumetric capacity of a chamber inclosed by the members, compressible and incompressible fluids within said chamber arranged so that the only fluid which can escape through said joint would be essentially incompressible fluid, a packing for the sliding joint, and means for varying the pressure on opposite sides of the packing to oppose leakage of fluid from the chamber through the packing.

22. A cushioning device comprising relatively movable members having a sliding joint to permit variations in the volumetric capacity of a chamber formed within said device, compressible and incompressible fluids within the chamber, said joint being so located with reference to the fluids that the only fluid which can escape through the joint would be essentially incompressible fluid, a packing for the joint, and means for automatically varying the pressures on opposite sides of the packing so that the pressure on the chamber side thereof is less than the pressure on the exterior side thereof.

23. A cushioning device comprising relatively movable members, having a sliding joint therebetween to permit variations in the volumetric capacity of a chamber inclosed by said members, a packing for the sliding joint, a passage located on the chamber side of said packing, and means for reducing the pressure within the passage below the pressure within the chamber.

24. A cushioning device comprising relatively movable members inclosing a fluid-containing chamber and having a sliding joint therebetween for varying the volumetric capacity of said chamber, a packing for said joint for resisting the leakage of fluid from said chamber through said joint, a passage between said packing and said chamber, and a pump actuated by the relative motion of the members for reducing the pressure in said passage and on one side of said packing.

25. A cushioning device comprising a hollow member, a plunger fitted to slide within the member and having a groove formed in the member engaging the surface thereof, a packing located on each side of said groove and between said member and said plunger to resist the leakage of fluid from the member past the plunger, and means responsive to relative movement of said member and plunger for reducing the pressure in the groove during periods of high pressure within the member and for thereby reducing the pressure on one side of one of said packings.

26. A cushioning device comprising a hollow member, a plunger fitted to slide within the member, and successive packings for the sliding joint between the plunger and the cylinder, and means for rendering one of said packings more effective and the other less effective as a packing agent during periods of high pressure within said cylinder.

27. A cushioning device comprising a hollow member, a plunger fitted to slide within the member, a packing for the sliding joint between the plunger and the member, and means for decreasing the pressure on the inner side and for increasing the pressure on the outer side of the packing during periods of high pressure within the hollow member.

28. A cushioning device comprising relatively movable members having a sliding joint therebetween to permit variations in the volumetric capacity of a fluid-containing chamber inclosed by said members, a packing for said joint, a pump responsive to relative motion between said members for decreasing the pressure on the chamber side of the packing, and means for increasing pressure on the exterior side of the packing during periods of high pressure within the chamber.

29. A cushioning device, comprising relatively movable members, having a sliding joint therebetween to permit of variations in the volumetric capacity of a fluid containing chamber inclosed by said member, an annular groove formed in the sliding face of one of said members, packings for the sliding joint located on each side of said groove, and a pump, the operation of which is controlled by the relative motion of the members, for reducing the pressure within said groove below the pressure in said chamber.

30. A cushioning device comprising a hollow member, a plunger fitted to slide within the member and having an annular groove formed in the member-engaging face thereof, a packing for the sliding joint and located within said groove, and means for reducing the pressure within the groove during the operation of the device.

Signed at New York city, in the county of New York and State of New York, this 24th day of February, A. D. 1910.

GEO. WESTINGHOUSE.

Witnesses:
 RICHARD LIEBAU,
 IRVING M. OBRIEGHT.